US008769286B2

(12) United States Patent
White et al.

(10) Patent No.: US 8,769,286 B2
(45) Date of Patent: Jul. 1, 2014

(54) METHODS AND SYSTEMS FOR INCREASING THE SECURITY OF ELECTRONIC MESSAGES

(75) Inventors: Conor Robert White, Fairfax, VA (US); Christopher Eric Holland, Fairfax, VA (US); Jason Scott Cramer, Vienna, VA (US); Christopher James Mort, Burke, VA (US); John Francis Oakley, III, Arlington, VA (US)

(73) Assignee: Daon Holdings Limited, George Town (KY)

( * ) Notice: Subject to any disclaimer, the term of this patent is extended or adjusted under 35 U.S.C. 154(b) by 95 days.

(21) Appl. No.: 13/237,002

(22) Filed: Sep. 20, 2011

(65) Prior Publication Data

US 2013/0074194 A1    Mar. 21, 2013

(51) Int. Cl.
*H04L 9/32* (2006.01)
*H04L 12/58* (2006.01)

(52) U.S. Cl.
CPC ............... *H04L 51/14* (2013.01); *H04L 51/24* (2013.01); *H04L 12/58* (2013.01); *H04L 51/34* (2013.01)
USPC ........... 713/170; 713/152; 713/156; 713/168; 726/11; 726/13; 726/14; 705/70; 709/206

(58) Field of Classification Search
USPC ........ 713/152, 156, 168, 170; 726/11, 13, 14; 705/70; 709/206
See application file for complete search history.

(56) References Cited

U.S. PATENT DOCUMENTS

| 7,523,309 | B1 | 4/2009 | Talbot et al. | |
|---|---|---|---|---|
| 7,945,520 | B2* | 5/2011 | Pizano et al. | 705/64 |
| 8,112,482 | B1* | 2/2012 | Geddes | 709/206 |
| 8,327,157 | B2* | 12/2012 | West | 713/189 |
| 2001/0037315 | A1* | 11/2001 | Saliba et al. | 705/70 |
| 2002/0129275 | A1* | 9/2002 | Decuir | 713/201 |
| 2002/0178229 | A1 | 11/2002 | Sinha et al. | |

(Continued)

FOREIGN PATENT DOCUMENTS

WO    WO 2004/054189 A1    6/2004
WO    WO 2011/028261 A2    3/2011

OTHER PUBLICATIONS

Extended European Search Report for EPO Application No. 12182468.4 dated Nov. 21, 2012, pp. 1-6.

(Continued)

*Primary Examiner* — Eleni Shiferaw
*Assistant Examiner* — Paul Callahan
(74) *Attorney, Agent, or Firm* — Kevin McDermott, Esq.

(57) ABSTRACT

A method for generating e-mail messages with increased security includes receiving an e-mail message at a control system. The e-mail message has recipients, a security level, control attributes, and e-mail message contents. Moreover, the method includes verifying the recipients at the control system, and storing the recipients, security level, control attributes, and e-mail message contents in the control system when each of the recipients is verified. Furthermore, the method includes generating modified e-mail messages from the e-mail message, transmitting each of the modified e-mail messages to a respective recipient, and capturing authentication data from one of the recipients when the one recipient indicates a desire to view the e-mail message contents with a communications device operated by the one recipient. When the one recipient is successfully authenticated, the method includes permitting the one recipient to view the e-mail message contents in accordance with the control attributes.

17 Claims, 9 Drawing Sheets

(56) References Cited

U.S. PATENT DOCUMENTS

2005/0020286 A1* 1/2005 Lazaridis et al. ............ 455/466
2006/0005020 A1* 1/2006 Hardt ............................ 713/166
2007/0005717 A1* 1/2007 LeVasseur et al. ........... 709/206
2007/0255790 A1 11/2007 Weksler et al.

OTHER PUBLICATIONS

Extended European Search Report for EPO Application No. 13153036.2 dated Jul. 10, 2013, pp. 1-6.

* cited by examiner

| Recipient | Recipient Identifers |
|---|---|
| John | J1M |
| Stan | S2M |
| Kathleen | K1F |
| Colleen | C2F |

| E-Mail Message Identifiers |
|---|
| EM1 |
| EM2 |
| EM3 |
| EM4 |

| Transaction Identifier | E-Mail Message Identifers | Recipient Identifers |
|---|---|---|
| ZE864LG75W | EM1 | J1M |
| WW951S5WV5 | EM1 | K1F |
| 02VX6YFNMA | EM1 | C2F |
| 95KM9R8UZ5 | EM2 | S2M |
| CU9VP6RQ27 | EM2 | K1F |
| NA861VTN2K | EM3 | J1M |
| ZT7L68RMMX | EM3 | C2F |
| 6S82L96U1V | EM3 | S2M |
| 0Z8P8A3Y6Q | EM4 | C2F |

METHODS AND SYSTEMS FOR INCREASING THE SECURITY OF ELECTRONIC MESSAGES

BACKGROUND OF THE INVENTION

This invention relates generally to methods and systems for increasing the security of electronic messages, and more particularly, to methods and systems for increasing the security of electronic mail messages transmitted over networks against fraudulent access by imposters and for increasing sender control over electronic mail messages after transmission.

Electronic mail (e-mail) accounts are generally associated with a user, and e-mail messages within the account contain information typically intended for the user only to see. In an effort to ensure that users only are able to access their e-mail accounts, and thus e-mail messages within the accounts, users are generally required to enter a username and password to access their accounts. However, imposters have been known to surreptitiously obtain such usernames and passwords for use in fraudulently accessing email accounts. Thus, imposters have been known to view e-mail messages within an account intended only for the user and to send fraudulent e-mail messages from the account.

It has been known to use identification systems in conjunction with e-mail systems in an effort to prevent imposters from fraudulently accessing e-mail accounts and thereby increase the security of e-mail messages. Such identification systems typically send encrypted e-mail messages that are to be decrypted upon receipt in order to access. Some such identification systems require the user to enter a secret personal identification number (PIN) prior to decrypting received e-mail messages. However, imposters have also been known to surreptitiously obtain PINS that are supposed to be secret and known only to users. As another effort to increase the security of e-mail messages, e-mail message senders have been known to manage e-mail messages such that recipients cannot forward or copy the messages. However, such efforts have not been known to meaningfully increase e-mail message security to a level that effectively prevents imposters from fraudulently accessing e-mail messages.

Consequently, e-mail message senders have not been known to exercise meaningful control over the security of e-mail messages after transmission. For example, e-mail senders are generally unable to control who may access messages after transmission and ensure that adequate authentication occurs prior to accessing e-mail messages after transmission. Moreover, senders are generally unable to control inadvertent e-mail distribution by e-mail message recipients.

BRIEF DESCRIPTION OF THE INVENTION

In one aspect, a method for generating e-mail messages with increased security is provided. The method includes receiving an e-mail message at a control system. The e-mail message has recipients, a security level, control attributes, and e-mail message contents. Moreover, the method includes verifying the recipients at the control system, and storing the recipients, security level, control attributes, and e-mail message contents in the control system when each of the recipients is verified. Furthermore, the method includes generating modified e-mail messages from the e-mail message, transmitting each of the modified e-mail messages to a respective recipient, and capturing authentication data from one of the recipients when the one recipient indicates a desire to view the e-mail message contents with a device operated by the one recipient. The method also includes authenticating the one recipient with an authentication system. When the one recipient is successfully authenticated, the method includes permitting the one recipient to view the e-mail message contents in accordance with the control attributes.

In another aspect, a computer system for increasing the security of e-mail messages is provided. The computer system includes at least one computing device configured to create and transmit e-mail messages, and at least one communications device configured to capture authentication data and communicate with other devices. Moreover, the computer system includes an authentication system including an authentication database. The authentication system is configured to communicate with the at least one communications device, to authenticate users sending and receiving e-mail messages, and to store enrollment data records of a plurality of users. Furthermore, the computer system includes a control system configured to generate and store identifiers, store and change control attributes of e-mail messages, store e-mail contents, check validity of e-mail message contents, and communicate with the authentication system and the at least one computing device. Additionally, the computer system includes an e-mail server configured to communicate with the at least one computing device and the control system.

The control system is further configured to generate modified e-mail messages from e-mail messages, transmit each modified e-mail message to a respective recipient, and transmit e-mail message contents to one of the respective recipients after the one respective recipient is successfully authenticated by the authentication system. The at least one computing device is further configured to display the e-mail message contents in accordance with control attributes assigned to the e-mail message after the one respective recipient is successfully authenticated.

In yet another aspect, a computer program recorded on a non-transitory computer-readable recording medium, included in an electronic mail security computer system for enabling increased security of e-mail messages, is provided. The computer program includes instructions, which when read and executed by the electronic mail security computer system, cause the electronic mail security computer system to verify that each recipient of an e-mail message can be authenticated. The e-mail message has control attributes and e-mail message content.

Moreover, the computer program causes the electronic mail security computer system to store the recipients, control attributes and e-mail message content. Furthermore, the computer program causes the electronic mail security computer system to generate modified e-mail messages from the e-mail message, transmit each of the modified e-mail messages to a respective recipient, and notify each respective recipient regarding receipt of the modified e-mail message. Additionally, the computer program causes the electronic mail security computer system to authenticate a respective recipient when the respective recipient indicates a desire to view the e-mail message content, and display the e-mail message contents in accordance with the control attributes for the respective recipient to see when the respective recipient is successfully authenticated.

BRIEF DESCRIPTION OF THE DRAWINGS

FIG. 4 is a diagram illustrating an exemplary recipient registry;

FIG. 5 is a diagram illustrating an exemplary e-mail registry;

FIG. 6 is a diagram illustrating an exemplary transaction registry used for associating transaction identifiers with e-mail recipients and e-mail message information;

DETAILED DESCRIPTION OF THE INVENTION

Figure 1:
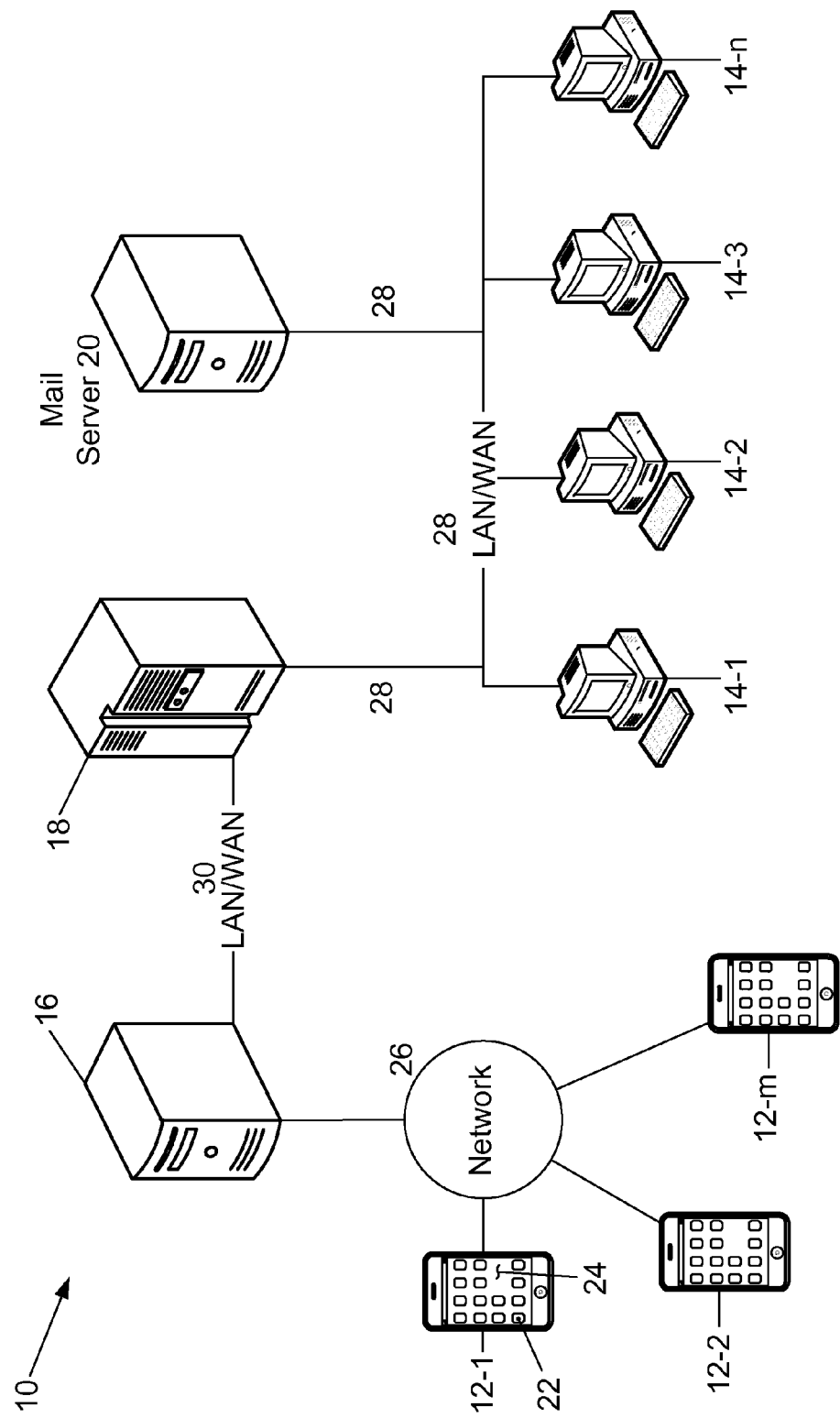
FIG. 1 is a block diagram of an exemplary embodiment of an e-mail security computer system for increasing the security of electronic messages against access by imposters.

FIG. 1 is an expanded block diagram of an exemplary embodiment of an Electronic Mail (e-mail) Security Computer (EMSC) System 10 for increasing the security of e-mail messages against fraudulent access by imposters. More specifically, the EMSC system 10 includes communications devices 12-1 to 12-m, computing devices 14-1 to 14-n, a Biometric Authentication Computer (BAC) System 16, a Control Computer (CC) system 18, and an e-Mail Server 20. Each of the communications devices 12-1 to 12-m is associated with a user. Each user may operate any one of the computing devices 14-1 to 14-n.

Each of the communications devices 12-1 to 12-m is a smart phone that stores applications therein, stores data therein, displays at least one of text and images, and captures authentication data. Each communications device 12-1 to 12-m may include at least one of buttons and icons 22 for at least entering commands and invoking applications stored therein, and a display screen 24 such as, but not limited to, a Liquid Crystal Display (LCD), that displays at least one of text and images. Moreover, each communications device 12-1 to 12-m may include at least one camera (not shown) and at least a microphone (not shown). Applications stored in each of the communications devices may include a security application that causes the communications device to perform functions such as, but not limited to, generating, transmitting, receiving and displaying e-mail messages, and capturing authentication data from users.

Although the communications devices 12-1 to 12-m are smart phones in the exemplary EMSC system 10, the communications devices may alternatively be any device capable of at least storing data, displaying at least one of text and images, and capturing and transmitting data. Such other devices include, but are not limited to, a portable cellular phone, a tablet computer, a laptop computer, any type of portable communications device having wireless capabilities such as a personal digital assistant (PDA), and a personal computer.

The communications devices 12-1 to 12-m are configured to communicate with the BAC system 16 over a communications network 26. The communications network 26 is a 3 G communications network. Alternatively, the communications network 26 may be any wireless network including, but not limited to, Wi-Fi, Global System for Mobile (GSM), Enhanced Data for GSM Evolution (EDGE), and any combination of a local area network (LAN), a wide area network (WAN) and the Internet. Moreover, the communications devices 12-1 to 12-m are configured to conduct at least wireless communications such as cellular telephone calls and to wirelessly access the Internet over the network 26.

The communications devices 12-1 to 12-m may determine whether captured authentication data is of sufficient quality for conducting an authentication transaction, and transmit the captured authentication data to the BAC system 16 after determining it is of sufficient quality. Moreover, the communications devices 12-1 to 12-m may process the captured authentication data prior to transmitting it to the BAC system 16. For example, the communications devices may capture biometric authentication data, create a biometric template from the captured data, and then transmit the biometric template to the BAC system 16.

Each of the computing devices 14-1 to 14-n is a personal computer that may include devices, such as, but not limited to, a CD-ROM drive for reading data from computer-readable recording mediums, such as a compact disc-read only memory (CD-ROM), a magneto-optical disc (MOD) and a digital versatile disc (DVD). Moreover, each of the computing devices 14-1 to 14-n may include a display device, such as, but not limited to, a liquid crystal display (LCD), a cathode ray tube (CRT) and other display monitors. Furthermore, each of the computing devices 14-1 to 14-n may include a printer and input devices such as, but not limited to, a mouse (not shown), keypad (not shown), a keyboard, a camera (not shown), a microphone (not shown), and any type of biometric capture device (not shown). Each of the computing devices 14-1 to 14-n stores applications therein, may capture biometric data, and is configured to communicate with the CC system 18, the E-mail Server 20, and other computing devices 14-n over a network 28 such as, but not limited to, a LAN, a WAN, and the Internet.

Although each of the computing devices 14-1 to 14-n is a personal computer in the exemplary EMSC system 10, each of the computing devices 14-1 to 14-n may alternatively be any computing device such as, but not limited to, tablet computers, laptop computers, smart phones, and any type of portable communications device having wireless capabilities such as a personal digital assistant (PDA). The designations "m" and "n" as used in conjunction with the communication device designation 12-m and with the computing device designation 14-n, respectively, are intended to indicate that any number "m" of communications devices 12-m and any number "n" of computing devices 14-n may be included in the EMSC system 10.

A user may be an e-mail message sender, an e-mail message recipient, or both. A user operating his communications device 12-m or one of the computing devices 14-n to create and transmit an e-mail message is referred to herein as a sender. A user operating his communications device 12-m or a computer device 14-n that receives an e-mail message is referred to herein as a recipient.

The BAC system 16 includes components such as, but not limited to, a web server, a database server, an application server, a directory server and a disk storage unit that may be used to store any kind of data. The disk storage unit may store at least one database such as, but not limited to, an authentication database. The application server stores applications therein. The BAC system 16 also includes a database management server and an authentication server. The database management server may be used to facilitate transferring data to and from the disk storage device. The authentication server performs matching of any feature or information associated with users to authenticate the identity of users as described herein.

The BAC system 16 is configured to communicate with the communications devices 12-*m* over the network 26 and the CC system 18 over a network 30, such as, but not limited to, a LAN, WAN, or Internet. The BAC system 16 may also perform functions such as, but not limited to, authenticating e-mail message senders and recipients, storing at least authentication data of each of a plurality of authorized users in a respective enrollment data record, extracting data from messages and determining quality of captured authentication data. The authentication data is biometric data that corresponds to any biometric modality desired to be used as the basis of authenticating a user. Such biometric modalities include, but are not limited to, voice, face, finger, iris, palm, and electrocardiogram, and any combination of voice, face, finger, iris, palm, and electrocardiogram. The biometric data may take any form such as, but not limited to, audio recordings and photographic images.

The enrollment data record of each authorized user stored in the BAC system 16 includes data such as, but not limited to, enrollment biometric data, enrollment biometric templates, and personal data. Enrollment biometric data is raw biometric data obtained from the user during enrollment in the BAC system 16. The enrollment biometric data for each user is processed during enrollment to generate at least one enrollment biometric template, for each respective user, which is used by the BAC system 16 to conduct authentication transactions. Personal data includes any demographic information regarding an individual including, but not limited to, an individual's name, age, date-of-birth, address, citizenship and marital status. Each enrollment data record may also include any kind of data that may be used to authenticate the identity of users as described herein.

Although the biometric data is captured from users during enrollment in the BAC system 16, the biometric data may alternatively be obtained by any other method such as, but not limited to, automatically reading or extracting the biometric data from identity documents or from legacy databases included in other computer systems. Likewise, biometric templates corresponding to the biometric data may be obtained by any method such as, but not limited to, automatically reading or extracting the biometric templates from identity documents or from legacy databases included in other computer systems. Biometric templates corresponding to desired biometric data may be obtained in addition to, or instead of, the desired biometric data. Such other legacy database systems include, but are not limited to, systems associated with motor vehicle administrations, social security administrations, welfare system administrations, financial institutions and health care providers. Such identity documents include, but are not limited to, passports and driver's licenses. By extracting desired biometric data or biometric templates from a legacy database or identity document, and storing the extracted data in the BAC system 16, users may be enrolled therein without having to directly provide biometric data.

The BAC system 16 may also store configurable authentication policies some of which may be used to determine data that is to be captured or obtained from users during enrollment in the BAC system 16, and others which may be used to determine data to be captured from users during authentication transactions.

The CC system 18 includes components such as, but not limited to, a web server, a database server, an application server, a directory server and a disk storage unit that may be used to store any kind of data. The disk storage unit may store databases such as, but not limited to, an e-mail message database.

The CC system 18 is configured to communicate with the BAC system 16 over the network 30 and with the e-mail server 20 and computing devices 14-*n* over the network 28. The CC system 18 stores applications such as, but not limited to, an e-mail security application. The e-mail security application causes the CC system 18 to perform functions such as, but not limited to, generating and storing e-mail message identifiers, recipient identifiers, and transaction identifiers, and associating the identifiers with each other. Moreover, the security application may cause the CC system 18 to perform functions such as, but not limited to, generating functions and associating each function with a corresponding e-mail message, storing e-mail message information, changing control attributes, replacing e-mail message contents with a function, checking the validity of e-mail contents stored therein, generating and transmitting authentication request messages, retrieving e-mail message contents, and transmitting e-mail message contents to recipients. Authentication request messages include at least information that facilitates determining an authentication data requirement. The CC system 18 may also store configurable authentication policies that facilitate associating different authentication data requirements with an e-mail message.

The e-mail server 20 is a computer that manages e-mail messages by receiving e-mail messages from devices such as, but not limited to, the computing devices 14-*n*, and transmitting e-mail messages to other devices. Moreover, the e-mail server 20 is configured to communicate with the computing devices 14-*n* over the network 28.

Each of the computing devices 14-*n*, together with the network 28, the e-mail server 20, and the CC system 18, forms a different communications channel. Consequently, each computing device 14-*n* together with the network 28, the e-mail server 20, and the CC system 18 constitutes a communications channel that is referred to herein as a first communications channel. Each of the communications devices 12-*m*, together with the communications network 26 and the BAC system 16, also forms a different communications channel. Consequently, each communications device 12-*m*, together with the communications network 26 and the BAC system 16, constitute a communications channel separate and distinct from the first communications channel. The separate and distinct communications channel is referred to herein as a second communications channel. Imposters that are able to monitor communications and steal identity information over the first communications channel typically are not aware of the second communications channel, and vice versa, and thus are not motivated to monitor communications over the other channel.

Each user is assumed to be in possession of his communications device 12-*m* and is assumed to be contactable using his communications device 12-*m*. Thus, by virtue of transmitting a data capture request to the communications device 12-*m* of a user, the data capture request is considered to be transmitted to the user. Authentication data is to be obtained by and transmitted from a single communications device that is out-of-band with a computing device 14-*n* operated by the user, that is, any communications device separate and distinct from the computing device 14-*n* operated by the user, and that communicates on a different channel than the computing device 14-*n* operated by the user. Each of the communication devices 12-*m* is such an out-of-band communications device. Thus, after reading, or obtaining, a data capture request transmission from the communications display screen 24, the user provides authentication data in accordance with the authentication data request which is captured by the communications device 12-*m*. A data capture request is a message generated by the BAC system 16 that requests the user of a device 12-*m* to capture authentication data.

The communications devices 12-*m*, the computing devices 14-*n*, the BAC system 16, the CC system 18, and the e-mail server 20, respectively, each include a processor (not shown) and a memory (not shown). It should be understood that, as used herein, the term processor is not limited to just those integrated circuits referred to in the art as a processor, but broadly refers to a computer, an application specific integrated circuit, and any other programmable circuit. It should be understood that the processors execute instructions, or computer programs, stored in the respective memories (not shown) of the communications devices 12-*m*, the computing devices 14-*n*, the BAC system 16, the CC system 18, and the E-mail Server 20. The above examples are exemplary only, and are thus not intended to limit in any way the definition and/or meaning of the term "processor."

The respective memories (not shown) in the communications devices 12-*m*, the computing devices 14-*n*, the BAC system 16, the CC system 18, and the E-mail Server 20 can be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like.

Each of the memories (not shown) can be a computer-readable recording medium used to store data, respectively, in the communications devices 12-*m*, the computing devices 14-*n*, the BAC system 16, the CC system 18, and the e-mail server 20. Moreover, each of the respective memories (not shown) can be a computer-readable recording medium used to store computer programs or executable instructions that are executed, respectively, by the communications devices 12-*m*, the computing devices 14-*n*, the BAC system 16, the CC system 18, and the e-mail server 20. Furthermore, the memories (not shown) may include smart cards, SIMs or any other medium from which a computing device can read computer programs or executable instructions. As used herein, the term "computer program" is intended to encompass an executable program that exists permanently or temporarily on any computer-readable recordable medium that causes the computer or computer processor to execute the program and thus causes the computer to perform a function. Applications as described herein are computer programs.

An authentication data requirement is a requirement for authentication data that is to be used for conducting authentication transactions. The authentication data requirement may be a requirement for any kind of information that may be used to authenticate users such as, but not limited to, biometric data, Global Positioning System (GPS) coordinates, pass-phrases, passwords, personal identification numbers, and any combination of biometric data, GPS coordinates, passwords, pass-phrases, and personal identification numbers. Moreover, the authentication data requirement may be determined in any manner.

Figure 2:
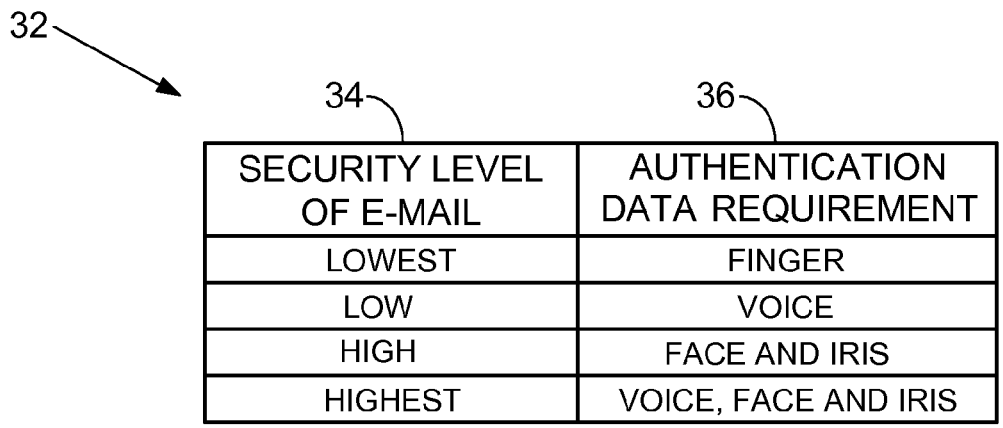
FIG. 2 is a diagram illustrating an exemplary configurable authentication policy.

FIG. 2 is a diagram illustrating an exemplary configurable authentication policy 32 that may be stored in the BAC system 18, and may be used for determining authentication data requirements 36. More specifically, the authentication policy 32 includes four different security levels 34 and an authentication data requirement 36 corresponding to each different security level 34. The security levels 34 vary from a highest level to a lowest level. Each security level 34 corresponds to the degree of security a sender may desire to associate with the contents of an e-mail message, in an effort to prevent the e-mail message contents from being fraudulently accessed by an imposter. A security level 34 may be assigned to each e-mail message by the sender. For example, an e-mail message containing information about changing time from Daylight Savings Time to Standard Time may be assigned a lowest security level 34, while an e-mail message regarding highly sensitive corporate merger plans may be assigned a highest level of security 34. Instead of assigning a security level 34 to each e-mail message, a sender may assign any information to each e-mail message that facilitates determining the authentication data requirement of the e-mail message.

As the security level 34 increases, the authentication data requirement 36 may become more demanding. For example, as the security level 34 of an e-mail message increases, the number of different biometric modalities required for validation may also increase. Alternatively, as the security level 34 of an e-mail message increases, the higher security levels 34 may not require additional biometric modalities for validation. Instead, the security levels 34 may require a single different biometric modality. Specifically, the low security level 34 may require voice biometric data, the high security level 34 may require face biometric data, and the highest security level 34 may require iris biometric data.

The authentication data requirement 36 for a security level 34 may be a combination of the authentication data requirements 36 appropriate for lower security levels 34. For example, the authentication data requirement 36 for the highest security level 34 may be a combination of the authentication data requirements 36 of the high and low security levels 34.

The authentication policy 32 may be reconfigured by defining the authentication data requirements 36 and the security levels 34 in any desirable manner. Moreover, the policy 32 may be reconfigured by changing the definitions of the authentication data requirements 36 and the security levels 34. For example, the authentication data requirement 36 for a high security level 34 may be reconfigured to be face, iris and fingerprint biometric data, instead of face and iris biometric data. The authentication policy 32 may also be stored in the communications devices 12-*m*, the computing devices 14-*n*, and the CC system 18. Although the authentication policy 32 includes four security levels 34 and associated authentication data requirements 36 as described herein, the authentication policy 32 may alternatively include any number of security levels 34 and associated authentication data requirements 36.

Additional configurable authentication policies may also be stored in the BAC system 16 that determine the authentication data requirement 36. For example, authentication policies may determine the authentication data requirement 36 based on factors such as, but not limited to, whether a sender and a recipient belong to a same organization or whether the e-mail message includes attachments.

Instead of storing configurable authentication policies in the BAC system 16 or the CC system 18, one authentication data requirement 36 may be defined and used for all authentication transactions. For example, the one authentication data requirement 36 may indicate that face and voice biometric data are to be captured and used for each authentication transaction. Alternatively, the one authentication data requirement 36 may indicate that a personal identification number is to be obtained and used for each authentication transaction. The one authentication data requirement 36 may be stored in the BAC system 16 or the CC system 18.

Figure 3:
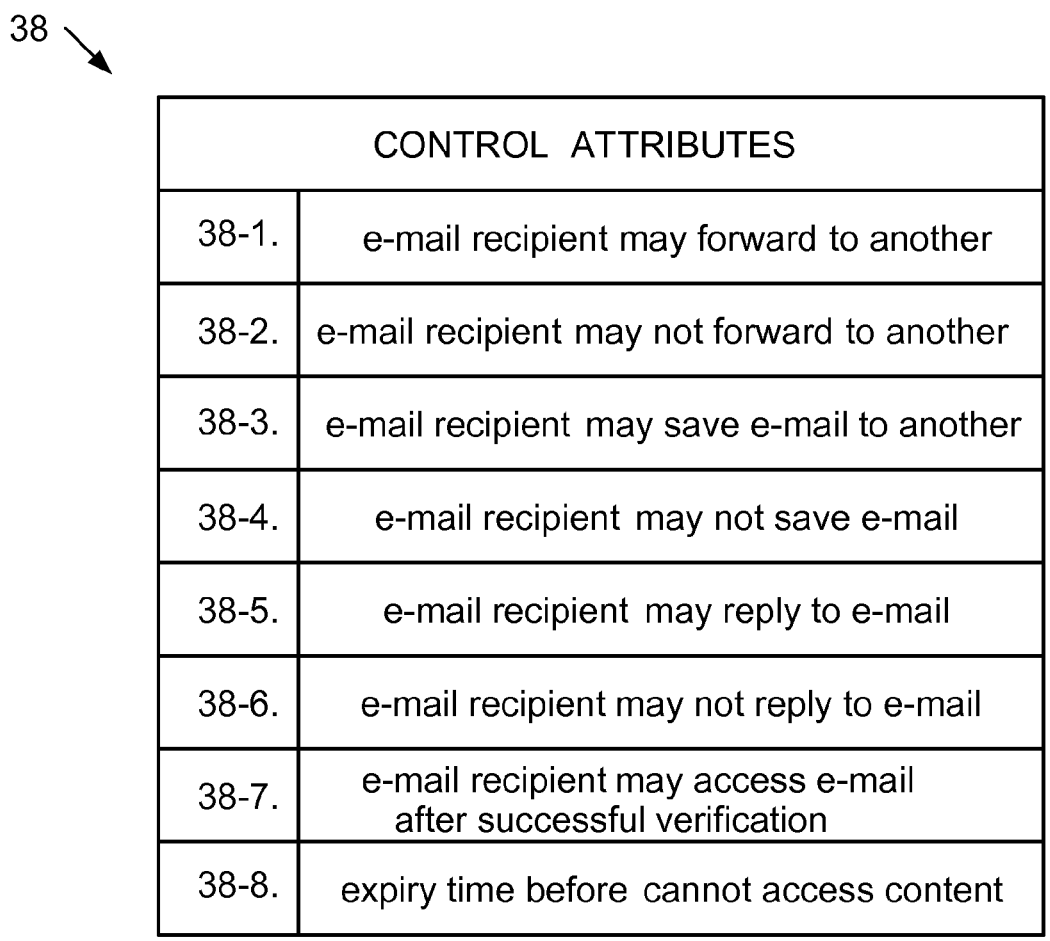
FIG. 3 is a diagram illustrating a registry of exemplary control attributes.

FIG. 3 is a diagram illustrating a registry 38 of exemplary control attributes 38-1 to 38-8 that may be assigned to an e-mail message by a sender to facilitate increasing sender control over access to transmitted e-mail messages, and thereby facilitate increasing the security of e-mail messages against access by imposters. More specifically, the registry 38 includes first 38-1 and second control attributes 38-2 that, respectively, permit a recipient to forward an e-mail message to another recipient and prohibit the recipient from forwarding the e-mail to another recipient. The registry 38 also includes third 38-3 and fourth 38-4 control attributes that, respectively, permit a recipient to save the e-mail in a data storage device and prohibit the recipient from saving the e-mail in the data storage device. Moreover, the registry 38 includes fifth 38-5 and sixth 38-6 control attributes that, respectively, permit a recipient to reply to an e-mail message and prohibit the recipient from replying to the e-mail message. Furthermore, the registry 38 includes a seventh control attribute 38-7 that permits a recipient to access an e-mail message after being successfully authenticated. Additionally, the registry 38 includes an eighth control attribute 38-8 that establishes an expiry time for an e-mail message that determines the period in which the contents of an e-mail message may be accessed.

Any one of, or any combination of the control attributes 38-1 to 38-8, may be selected by a sender and assigned to an e-mail message such that the control attributes may be executed prior to or while a recipient accesses the e-mail message contents. However, it should be understood that conflicting control attributes cannot be included in the same e-mail message by a sender. For example, a sender cannot include the first 38-1 and second 38-2 control attributes in the same e-mail message. Although the registry 38 includes eight control attributes, the registry 38 may alternatively include any number of control attributes that facilitate enabling senders to increase the security of e-mail messages against access by imposters. The control attributes may be changed by the sender at any time before or after the e-mail message expires. Consequently, for example, the sender may change the control attributes of an e-mail message by extending the expiry time of the e-mail message after it has expired.

FIG. 4 is a diagram illustrating an exemplary recipient registry 40 stored in the CC system 18 that includes the names and respective recipient identifiers of e-mail messages. More specifically, the recipient registry 40 includes the names of recipients John, Stan, Kathleen, and Colleen, and respective recipient identifiers J1M, S2M, K1F, and C2F. The recipient identifiers are generated by the CC system 18 such that a different recipient identifier is associated with each recipient. Although the recipient registry 40 includes four recipients as described herein, the recipient registry 40 may alternatively include any number of recipients and respective recipient identifiers.

FIG. 5 is a diagram illustrating an exemplary e-mail registry 42 stored in the CC system 18. More specifically, the e-mail registry 42 includes e-mail message identifiers EM1, EM2, EM3, and EM4, that are each associated with different e-mail message contents stored in the CC system 18. The e-mail message identifiers are generated by the CC system 18 such that each e-mail message identifier is different. Although four e-mail message identifiers are included in the registry 42, alternatively, the e-mail registry 42 may include any number of e-mail message identifiers.

FIG. 6 is a diagram illustrating an exemplary transaction registry 44 stored in the CC system 18 that is used for associating transaction identifiers with e-mail message information and e-mail message recipients. More specifically, the transaction registry 44 includes a column for transaction identifiers, e-mail message identifiers, and recipient identifiers such that each transaction identifier is associated with a corresponding e-mail message identifier and a recipient identifier of the corresponding e-mail message identifier. When an e-mail message has a plurality of recipients, each transaction identifier is associated with the corresponding e-mail message identifier and a different recipient identifier. By virtue of being associated with a corresponding e-mail message identifier, each transaction identifier is associated with the information of the e-mail message identified by the e-mail message identifier.

The transaction registry 44 may be used to map a transaction identifier extracted from an e-mail message to an e-mail message identifier associated with the e-mail message. Moreover, the transaction registry 44 may be used to map the extracted transaction identifier to a recipient identifier of the e-mail message identifier. For example, when the extracted transaction identifier is WW951S5WV5, the extracted transaction identifier is compared against those in the transaction registry 44. As a result, it is determined that the extracted transaction identifier is included in the transaction registry 44 and maps to e-mail message EM1 and to recipient identifier K1F. Because the mapped recipient identifier is K1F, the recipient is Kathleen.

The recipient identifiers, the e-mail message identifiers, and the transaction identifiers are alphanumeric text strings and may be of any length. Alternatively, the recipient identifiers, e-mail message identifiers, and the transaction identifiers may be numeric character strings or alphabetic character strings. The function included in an e-mail message that facilitates accessing e-mail message contents may be any function such as, but not limited to, a hyperlink or a script file.

Figure 7:
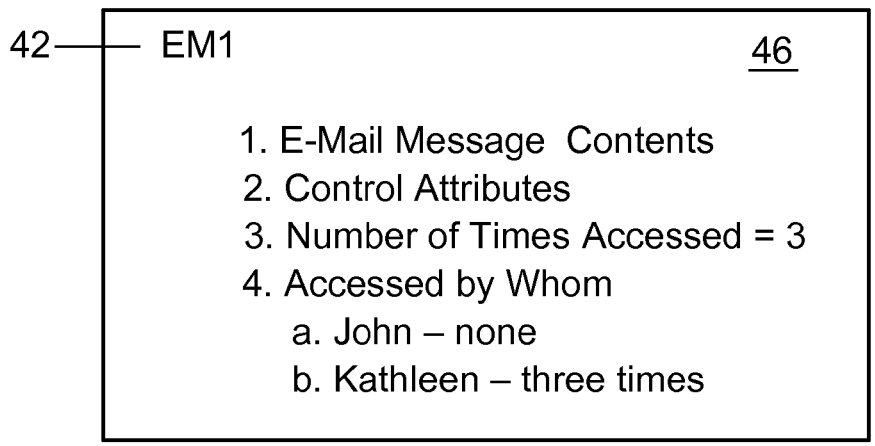
FIG. 7 is an exemplary screen display illustrating information that may be associated with an e-mail message.

FIG. 7 is an exemplary screen display 46 illustrating information that may be associated with an e-mail message and viewed by the sender after transmission. More specifically, the screen display 46 includes the e-mail identifier 42 corresponding to an e-mail message selected by the sender for viewing as well as e-mail message information. The e-mail message information includes, but is not limited to, the e-mail message contents, control attributes assigned to the e-mail message by the sender, and the number of times the e-mail message has been accessed and by whom. The e-mail message contents include, but are not limited to, any drafted messages included in the e-mail message and attachments associated with the e-mail message. The e-mail message information may be different than that described herein and may include, but is not limited to, the security level 34 and the recipients of the e-mail message.

Figure 8:
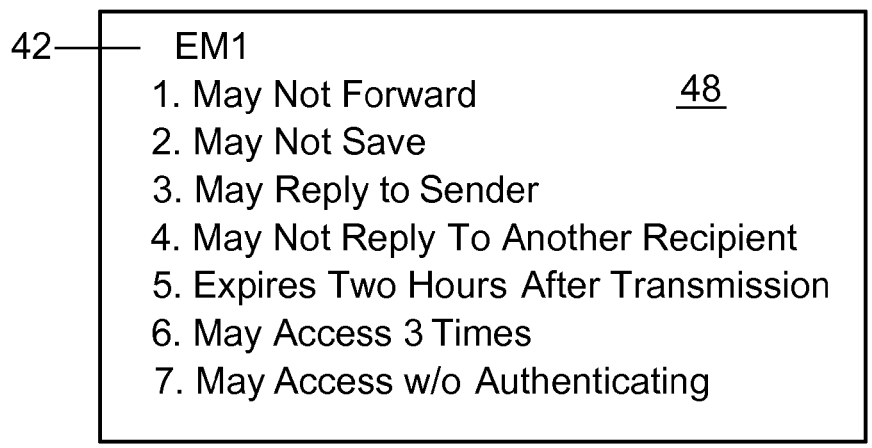
FIG. 8 is an exemplary control attribute display screen.

FIG. 8 is an exemplary control attribute display screen 48 illustrating control attributes assigned to the selected e-mail message. More specifically, the control attributes include prohibiting recipients from forwarding the e-mail message to others, prohibiting recipients from saving the e-mail message to a storage device, permitting recipients to reply to the sender, prohibiting recipients from replying to each other, requiring the e-mail message to expire two hours after transmission, permitting recipients to access the e-mail message up to three times, and permitting users to access the e-mail without being authenticated.

The control attributes may be changed by the sender after transmitting the e-mail message. Consequently, upon viewing the display screen 46, should the sender decide to change at least one control attribute, the sender clicks on the "Control Attributes" text. Next, the sender is presented with the control attribute display screen 48 illustrating the control attributes assigned to the e-mail message. For example, upon viewing the display screen 46 one hour and forty-five minutes after transmitting the e-mail message, the sender may notice that John has only fifteen minutes to access the e-mail message before it expires. Because the sender believes it is important for John to access and view the e-mail message, the sender may decide to change the expiration time so that John has more time to review the e-mail message. After clicking on the "Control Attribute" text of the display screen 46, the sender is presented with the control attribute display screen 48. The sender changes the expiration time to ten hours after transmission. While changing the expiration time, the sender notices that he accidentally permitted recipients to access the e-mail without authenticating. Consequently, the sender also changes the control attributes to indicate that recipients are required to authenticate prior to accessing the e-mail.

Figure 9:
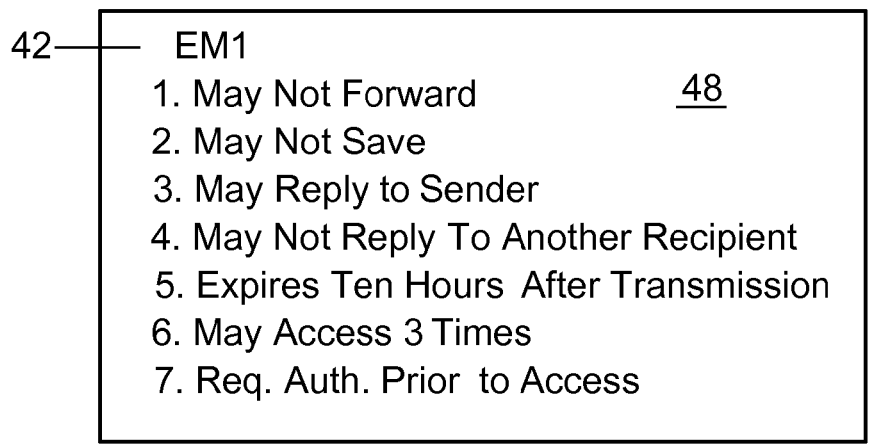
FIG. 9 is the control attribute display screen as shown in FIG. 8 including changes to the control attributes.

The information shown in FIG. 9 is the same information shown in FIG. 8 as described in more detail below. As such, features illustrated in FIG. 9 that are identical to features illustrated in FIG. 8 are identified using the same reference numerals used in FIG. 8.

FIG. 9 is the exemplary control attribute display screen 48 illustrating control attributes assigned to the selected e-mail message after the changes are made by the sender. More specifically, the control attribute display screen 48 has been changed to include a control attribute that causes the e-mail message to expire ten hours after transmission and a control attribute that requires recipients to authenticate prior to accessing the e-mail message. The e-mail message information, including the changed control attributes, is stored in the CC system 18.

Figure 10:
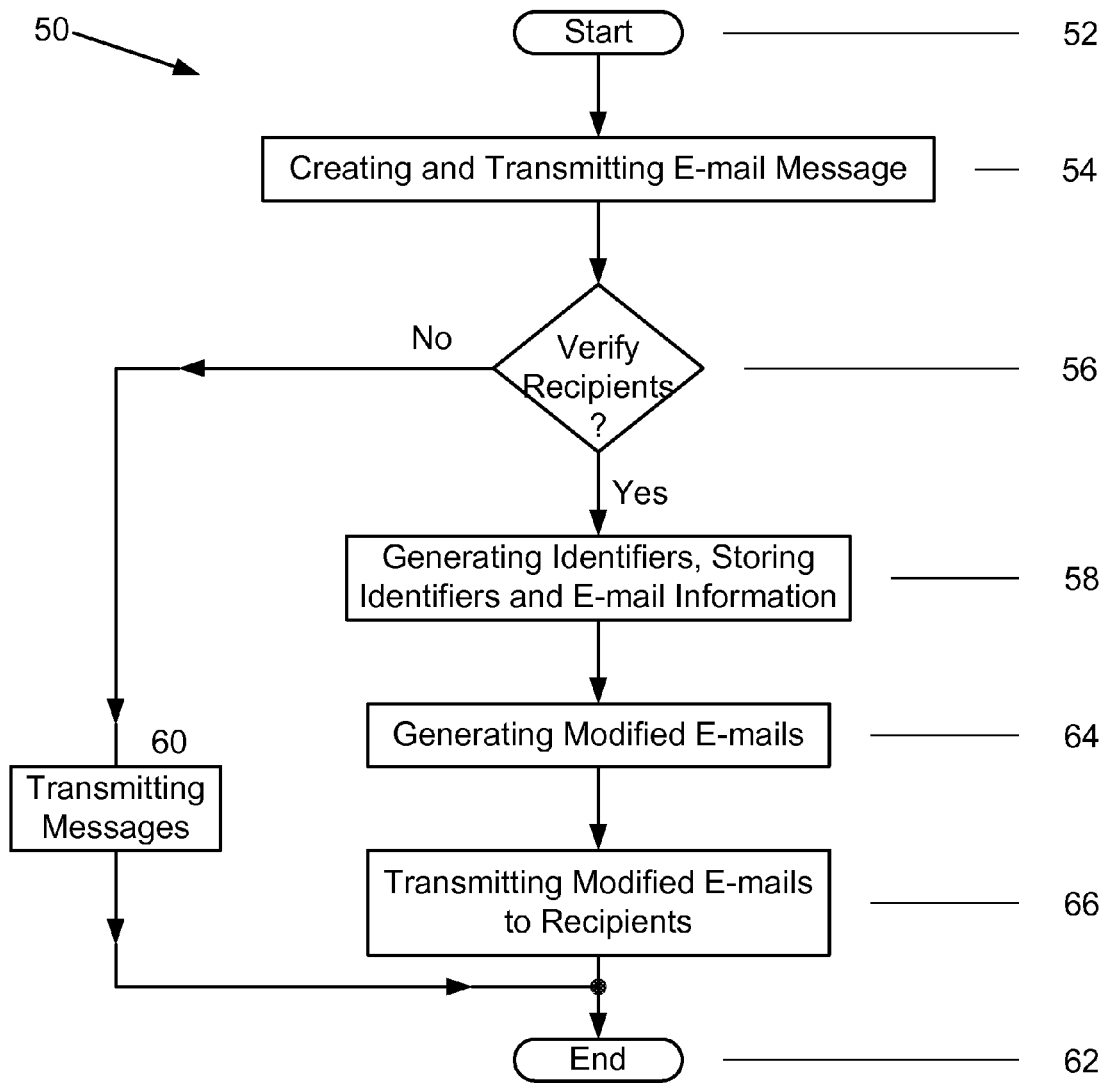
FIG. 10 is a flowchart illustrating an exemplary process for generating e-mail messages.

FIG. 10 is a flowchart 50 illustrating an exemplary process used by the EMSC system 10 for generating e-mail messages with increased security. For the EMSC system 10, the process starts 52 when a user operating the computing device 14-1 creates an e-mail message 54. More specifically, the user continues by drafting the e-mail message, determining that the e-mail message includes contents requiring additional protection against fraudulent access by imposters, determining a security level 34 and associating the security level 34 with the e-mail message, determining control attributes for the message and assigning the control attributes to the e-mail message, and specifying recipients of the e-mail message. The user may also associate attachments with the e-mail message. After creating the e-mail message 54, the user continues by transmitting the e-mail message 54 to the CC system 18. The user operating the computing device 14-1 is the e-mail message sender, and the specified recipients are the users operating the computing devices 14-2 and 14-3. Thus, there are two specified recipients. Alternatively, the sender may specify different recipients and may specify any number of recipients.

After receiving the e-mail message at the CC system 18, processing continues by verifying that each specified recipient 56 may be authenticated prior to transmitting the e-mail message to the specified recipients. More specifically, the CC system 18 continues processing by obtaining the names and recipient identifiers of each specified recipient from the e-mail message, and transmitting the names to the BAC system 16. The BAC system 16 continues processing by comparing the names against the enrollment data records. A match between a name and an enrollment data record indicates that the specified recipient is enrolled in the BAC system 16 and thus may be authenticated. The BAC system 16 continues by generating a list that includes the specified recipients enrolled therein and the specified recipients not enrolled therein, and transmitting the list to the CC system 18. The CC system 18 processes the list to verify that all of the specified recipients may be authenticated.

After verifying that all of the specified recipients 56 may be authenticated, the CC system 18 continues processing by generating 58 an e-mail message identifier for the e-mail message and generating 58 a different transaction identifier for each recipient of the e-mail message. Next, the CC system continues by storing 58 the generated e-mail message identifier, the generated transaction identifiers, and the obtained recipient identifiers in the transaction registry 44. By virtue of being stored in the transaction registry 44, the generated e-mail message identifier, the generated transaction identifiers, and the obtained recipient identifiers are associated with and map to each other. The CC system 18 also stores the e-mail message information 58 therein. Otherwise, when all of the specified recipients cannot be authenticated 56, the CC system 18 continues processing by transmitting a message 60 to the computing device 14-1 notifying the sender that the e-mail message cannot be sent, and processing ends 62.

After storing the identifiers and e-mail message information 58, the CC system 18 continues by generating a modified e-mail message 64 from the e-mail message for each specified recipient. More specifically, the CC system 18 continues processing by generating a different function that facilitates accessing the e-mail message contents for each specified recipient, removing the contents from the e-mail message to thereby generate a modified e-mail message, generating a copy of the modified e-mail message for each specified recipient, and inserting a different function in a respective one of the modified e-mail messages. The functions each have embedded therein a respective one of the generated transaction identifiers. The control attributes of the e-mail message transmitted from the sender are also assigned to each of the modified e-mail messages. Next, the CC system 18 continues processing by storing the modified e-mail messages therein and transmitting each modified e-mail message 66 to the computing device 14-1, which continues by transmitting the modified e-mail messages to the respective specified recipients through the e-mail server 20. Next, processing ends 62.

The modified e-mail messages as transmitted to the respective recipients do not include the control attributes and thus are not displayed in accordance with the control attributes. Moreover, it should be understood that because the e-mail message contents are not included in the modified e-mail messages, the e-mail contents are not stored with each modified e-mail message in the CC system 18. Rather, it should be understood that one copy of the e-mail message contents is stored as part of the e-mail message information 58 in the CC system 18.

Although specified recipients are verified 56 after the e-mail message is transmitted by the sender in the exemplary e-mail message generation process, the specified recipients may alternatively be verified while the sender is drafting the e-mail message. Thus, the specified recipients may be verified before the sender transmits the e-mail message. In such alternative processes, the computing device 14-1 operated by the sender and the CC system 18 communicate to verify each of the specified recipients while the user is drafting the message. When each of the specified recipients is verified, a message is displayed on the screen 24 advising the sender of the suitability of the intended recipients. Otherwise, a message is displayed for the sender to see indicating which of the specified recipients were verified and which were not.

Although all of the specified recipients are required to be verified in the exemplary e-mail message generation process, in alternative processes fewer than all of the specified recipients may be verified. In such alternative processes, verified specified recipients receive the e-mail message contents, while those that are not verified do not. More specifically, after determining that at least one of the specified recipients cannot be verified, the CC system 18 continues processing by removing the non-matching specified recipients from the e-mail message. In yet other alternative processes, the CC system 18 may continue processing by reviewing the control attributes of the e-mail message to determine whether authentication of recipients is required. If not, the CC system 18 continues by generating and storing the identifiers and information 58, and generating a modified e-mail message for each of the specified recipients 64.

Figure 11:
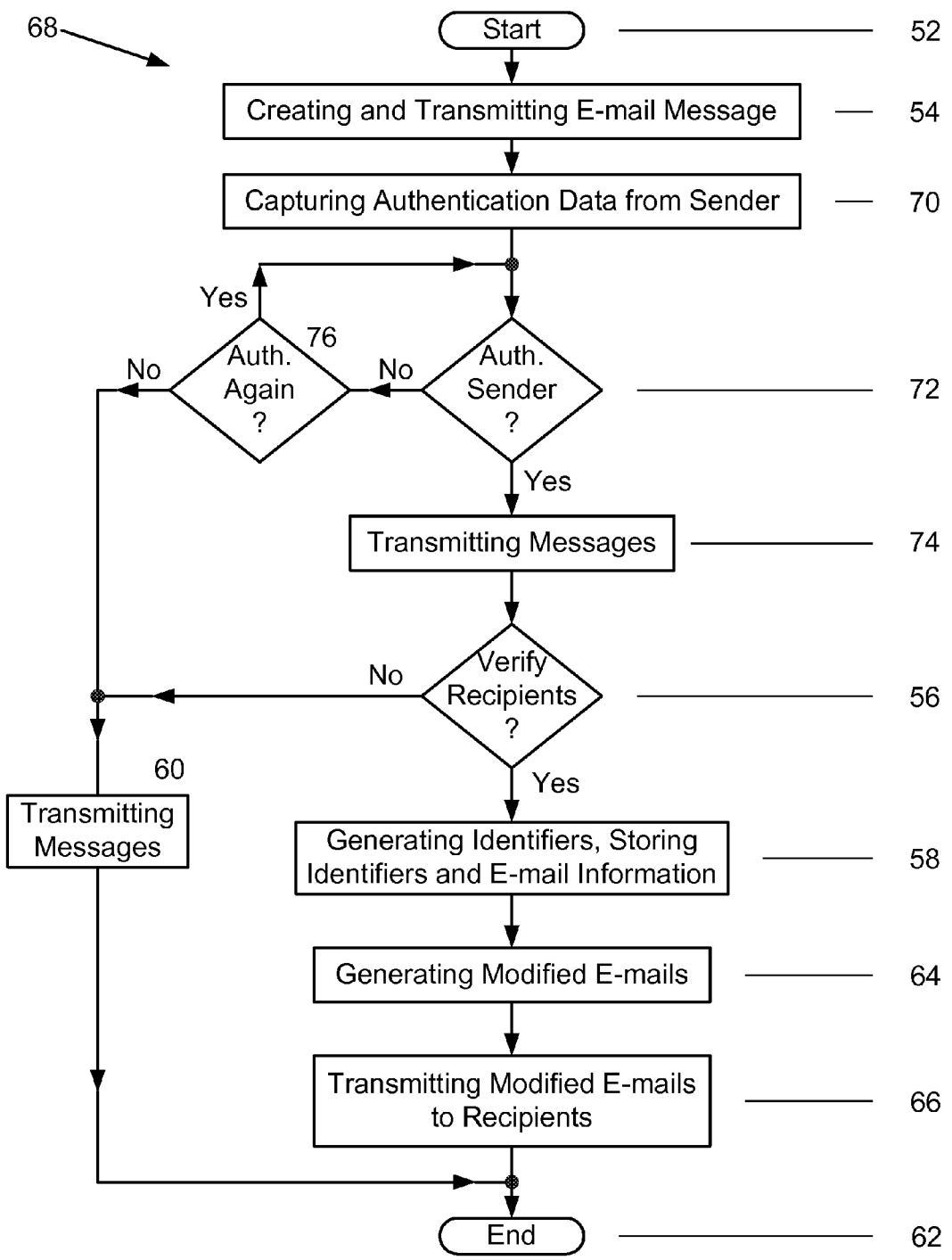
FIG. 11 is a flowchart illustrating an alternative exemplary process for generating e-mail messages.

The information shown in FIG. 11 is the same information shown in FIG. 10 as described in more detail below. As such, operations illustrated in FIG. 11 that are identical to operations illustrated in FIG. 10 are identified using the same reference numerals used in FIG. 10.

FIG. 11 is a flowchart 68 illustrating an alternative exemplary process used by the EMSC system 10 for generating e-mail messages with increased security. This alternative embodiment is similar to that shown in FIG. 10. However, the sender is authenticated prior to verifying the recipients 56. After transmitting the e-mail message 54 to the CC system 18, processing continues by capturing authentication data from the sender 70. More specifically, the CC system 18 continues processing by generating an authentication request message and transmitting the authentication request message to the BAC system 16. The authentication request message includes at least the security level 34 of the e-mail message and a request that the BAC system 16 conduct an authentication transaction with the sender.

After receiving the authentication request message, the BAC system 16 continues processing by extracting the security level 34 from the authentication request message, determining an authentication data requirement corresponding to the extracted security level, generating a data capture request message that includes at least the authentication data requirement, and transmitting the data capture request message to the communications device 12-*m* of the sender. Next, the communications device 12-*m* continues processing by displaying the authentication data requirement on the screen 24 for the sender to see. After reading the authentication data requirement, the sender continues by capturing authentication data 70 with the communications device 12-*m* in accordance with the authentication data requirement.

Next, the communications device 12-*m* determines whether the captured authentication data is of sufficient quality for conducting an authentication transaction. When the captured data is insufficient, the communications device 12-*m* displays a message on the screen 24 prompting the sender to again capture authentication data in accordance with the authentication data requirement until sufficient quality authentication data is captured. Otherwise, when the captured authentication data is of sufficient quality, the sender continues by activating a button 22 that causes the communications device 12-*m* to continue processing by transmitting the captured authentication data to the BAC system 16. In this alternative exemplary e-mail generation process, the security level 34 is high so the authentication data requirement 36 is for face and iris biometric data.

Next, after receiving the captured authentication data from the communications device 12-*m*, the BAC system 16 continues processing by comparing the captured authentication data 72 against authentication data of the sender stored therein and generating a matching score. The matching score is compared against a threshold to determine if the captured authentication data and the stored authentication data match. When the captured authentication data matches the stored authentication data, the identity of the sender is successfully authenticated 72. The BAC system 16 continues by generating and transmitting a successful authentication message 74 to the CC system 18, and the CC system 18 in turn continues by transmitting the successful authentication message 74 to the computing device 14-1 which displays the successful authentication message for the sender to see. Otherwise, when the sender is not successfully authenticated 72, processing continues by authenticating the sender again 76 by repeating operation 72. In this alternative exemplary embodiment, the BAC system 16 may again 76 attempt to authenticate the sender by repeating operation 72 three times before determining that the sender cannot be authenticated 76. After determining that the sender cannot be authenticated 76, the BAC system 16 continues processing by transmitting a message 60 notifying the CC system 18 of the unsuccessful authentication, and the CC system 18 continues by transmitting a message notifying the computing device 14-1 of the unsuccessful authentication. Next, processing ends 62. Alternatively, the BAC system 16 may attempt to authenticate the recipient any number of times 76 before determining that the recipient cannot be authenticated 76.

After transmitting the successful authentication message 74 to the computing device 14-1, processing continues as in operations 56, 58, 60, 62, 64 and 66 described herein with regard to the exemplary message generation process illustrated in FIG. 10.

Authenticating the sender confirms that the sender is authorized to send e-mail messages to the specified recipients. Moreover, verifying that the sender is who he claims to be discourages authorized senders from fraudulently transmitting malicious e-mail messages using the identity of another different authorized user. As a result, the CC system 18 is facilitated to be protected against malicious e-mail messages and messages containing invalid data.

Figure 12:
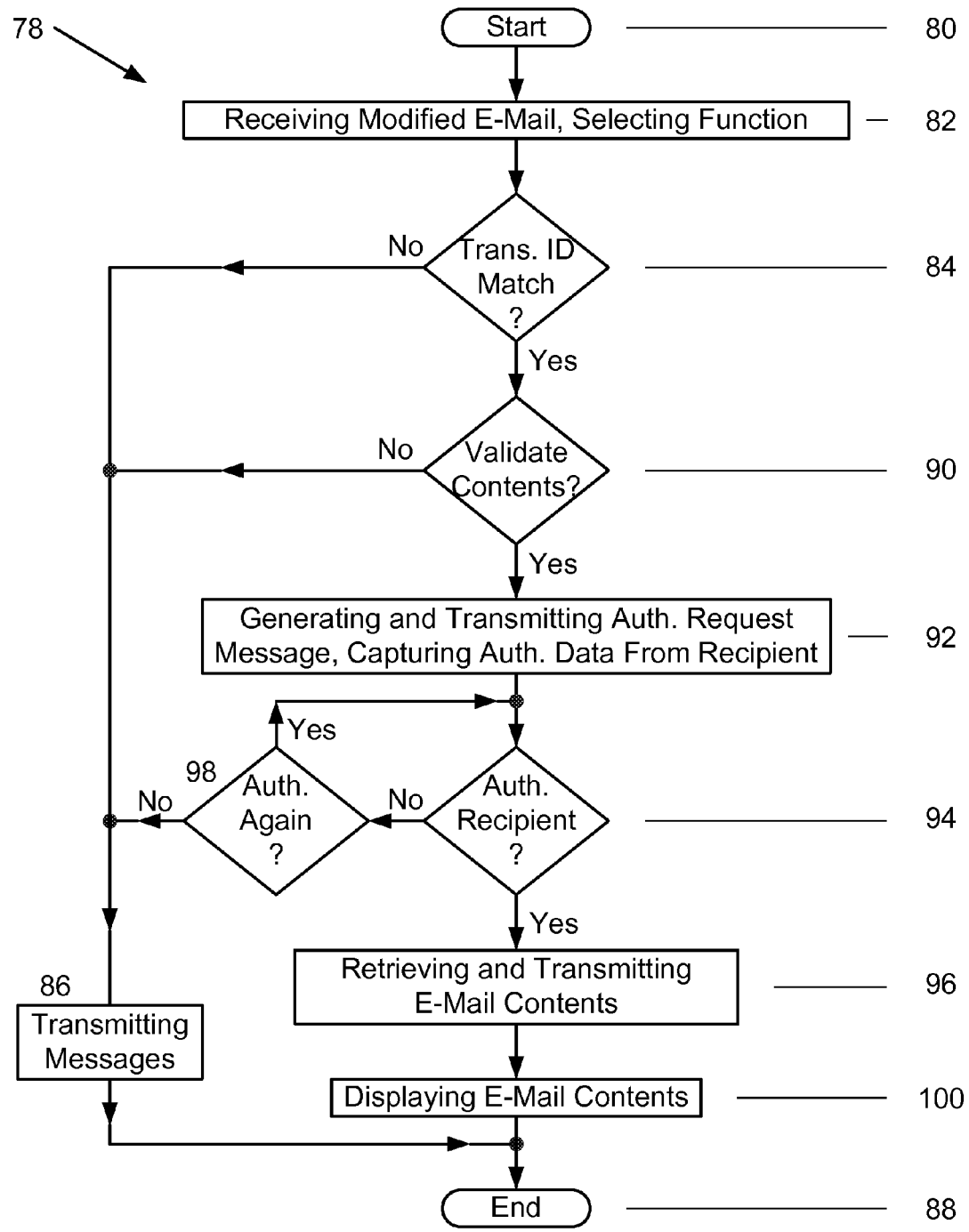
FIG. 12 is a flowchart illustrating an exemplary process for accessing contents of an e-mail message.

FIG. 12 is a flowchart 78 illustrating an exemplary process, used by a recipient of the modified e-mail message, for accessing the e-mail message contents stored in the CC system 18. As described in the exemplary e-mail message generation process, the e-mail message has two specified recipients, the users operating computing devices 14-2 and 14-3. However, because each of the specified recipients follows the same procedure for accessing e-mail contents, the exemplary accessing process is described with regard to one of the specified recipients, the specified recipient operating computing device 14-2.

The method starts 80 for the EMSC system 10 with the specified recipient operating the computing device 14-2 receiving a modified e-mail message 82 from the e-mail server 20. If the e-mail account program of the specified recipient is operating when the modified e-mail message is received, a notification message is displayed on the computing device 14-2 for the specified recipient to see. The notification message notifies the specified recipient regarding receipt of the modified e-mail message and prompts the specified recipient to proceed by selecting the function 82 included in the received modified e-mail message. Otherwise, if the e-mail account program of the specified recipient is not operating, the notification message appears when the e-mail account program of the specified recipient is next operating.

After reading the notification message, the specified recipient indicates a desire to access or view the e-mail message contents by selecting the function 82, which causes the computing device 14-2 to communicate with the CC system 18. Next, the CC system 18 continues processing by determining whether the e-mail message contents are stored therein. More specifically, the CC system 18 continues by extracting the transaction identifier from the selected function and comparing the extracted transaction identifier 84 against those included in the transaction registry 44. When the extracted transaction identifier matches a transaction identifier included in the transaction registry 44, the CC system 18 continues processing by determining that the e-mail contents are stored therein and by mapping the extracted transaction identifier to an e-mail message identifier and a recipient identifier. Otherwise, when the extracted transaction identifier does not have a match 84 in the transaction registry 44, the CC system 18 continues processing by transmitting a message 86 to the computing device 14-2 notifying the specified recipient that the e-mail message cannot be accessed. Next, processing ends 88.

After mapping the extracted transaction identifier to an e-mail message identifier and recipient identifier, the CC system 18 continues processing by validating 90 the e-mail message contents associated with the mapped e-mail identifier. Validating the e-mail message contents 90 includes, but is not limited to, verifying that the contents have not expired and can still be accessed, verifying that the contents have not been disabled, and verifying that the contents have not been deleted. After validating the e-mail message contents 90, the CC system 18 continues processing by generating an authentication request message 92 that includes at least the security level 34 of the e-mail message contents and a request for the BAC system 16 to authenticate the specified recipient, and transmitting the authentication request message 92 to the BAC system 16. Otherwise, when the e-mail message contents are not validated 90, processing continues by transmitting a message 86 to the computing device 14-2 notifying the specified recipient that the e-mail message contents cannot be accessed. Next, processing ends 88.

After receiving the authentication request message, the BAC system 16 continues processing by extracting the security level 34 from the authentication request message, determining an authentication data requirement corresponding to the extracted security level, generating a data capture request message that includes at least the authentication data requirement, and transmitting the data capture request message to the communications device 12-m of the specified recipient. Next, the communications device 12-m continues processing by displaying the authentication data requirement on the screen 24 for the specified recipient to see. After reading the authentication data requirement, the specified recipient continues by capturing authentication data 92 from his self with the communications device 12-m in accordance with the authentication data requirement.

Next, the communications device 12-m determines whether the captured authentication data is of sufficient quality for conducting an authentication transaction. When the captured authentication data is insufficient, the communications device 12-m displays a message on the screen 24 prompting the specified recipient to again capture authentication data in accordance with the authentication data requirement until sufficient quality authentication data is captured. Otherwise, when the captured authentication data is of sufficient quality, the specified recipient continues by activating a button 22 that causes the communications device 12-m to continue by transmitting the captured authentication data to the BAC system 16. In this exemplary content accessing process, the security level 34 is high so the authentication data requirement 36 is for face and iris biometric data.

After receiving the captured authentication data from the communications device 12-m, the BAC system 16 continues by comparing 94 the captured authentication data against authentication data of the specified recipient stored therein and generating a matching score. The matching score is compared against a threshold to determine if the captured authentication data and the stored authentication data match. When the captured authentication data matches the stored authentication data, the identity of the recipient is successfully authenticated 94, and the BAC system 16 continues by generating and transmitting a successful authentication message to the CC system 18. After receiving the successful authentication message, the CC system 18 continues processing by retrieving 96 the e-mail message contents and the control attributes of the modified e-mail message transmitted to the recipient operating device 14-2, assigning the retrieved control attributes to the e-mail message contents, and transmitting 96 the e-mail message contents to the computing device 14-2. Authenticating the specified recipient confirms that the specified recipient is authorized to access or view the e-mail message contents.

Next, the computing device 14-2 continues processing by displaying the e-mail message contents 100 in accordance with the retrieved control attributes for the specified recipient to see. More specifically, the computing device 14-2 continues by displaying the drafted message included in the e-mail message with any attachments for the specified recipient to see, while executing the retrieved control attributes assigned to the e-mail message contents. Next, processing ends 88.

When the specified recipient is not successfully authenticated 94, processing continues by authenticating the recipient again 98 by repeating operation 94. In this alternative exemplary embodiment the BAC system 16 may again 98 attempt to authenticate the recipient by repeating operation 94 three times before determining that the recipient cannot be authenticated 98. After determining that the recipient cannot be authenticated 98, the BAC system 16 continues processing by transmitting a message 86 notifying the CC system 18 of the unsuccessful authentication, and the CC system 18 continues by transmitting a message 86 to the computing device 14-2 notifying the specified recipient of the unsuccessful authentication. Next, processing ends 88. Alternatively, the BAC system 16 may attempt to authenticate the recipient any number of times 98 before determining that the recipient cannot be authenticated.

Although the exemplary content accessing process ends 88 after displaying the e-mail message contents 100, in alternative content accessing processes the recipient may also be permitted to access the e-mail contents of different e-mail messages associated with the recipient after the e-mail message contents are displayed 100. In such alternative processes, the computing device 14-2 may communicate with the CC system 18 such that the computing device 14-2 displays a list of e-mail messages associated with the recipient in the CC system 18. Each of the messages included in the list has a security level 34 that is the same as or lower than the security level 34 of the received modified e-mail message. Next, the recipient may continue by selecting at least one of the e-mail messages to view. The computing device 14-2 continues processing by communicating with the CC system 18 such that the computing device 14-2 may display the contents associated with the selected e-mail message for the recipient to see. The recipient may view any number of the displayed e-mail messages for a period of two minutes that starts upon successful authentication at operation 94. Moreover, when the recipient selects more than one e-mail message from the list, each of the selected messages may be simultaneously displayed. However, after the two minute period ends, the e-mail messages are no longer displayed for the recipient to see. In yet other alternative processes, recipients may view the selected e-mail message contents for any period of time that starts upon successful authentication at operation 94.

Although the specified recipient selects the function 82 in response to the notification message in the exemplary content accessing process, in alternative processes upon receiving the modified e-mail message, the computing device 14-2 may automatically communicate with the CC system 18 such that the CC system 18 continues by determining whether the e-mail message contents are stored therein. In such alternative processes, a notification message is not generated and transmitted, the recipient is not presented with the function and thus does not select the function, and the e-mail account program of the specified recipient is required to be operating. It should be understood that in alternative e-mail content accessing processes, the CC system 18 may determine whether the e-mail message contents are stored therein in any manner.

Figure 13:
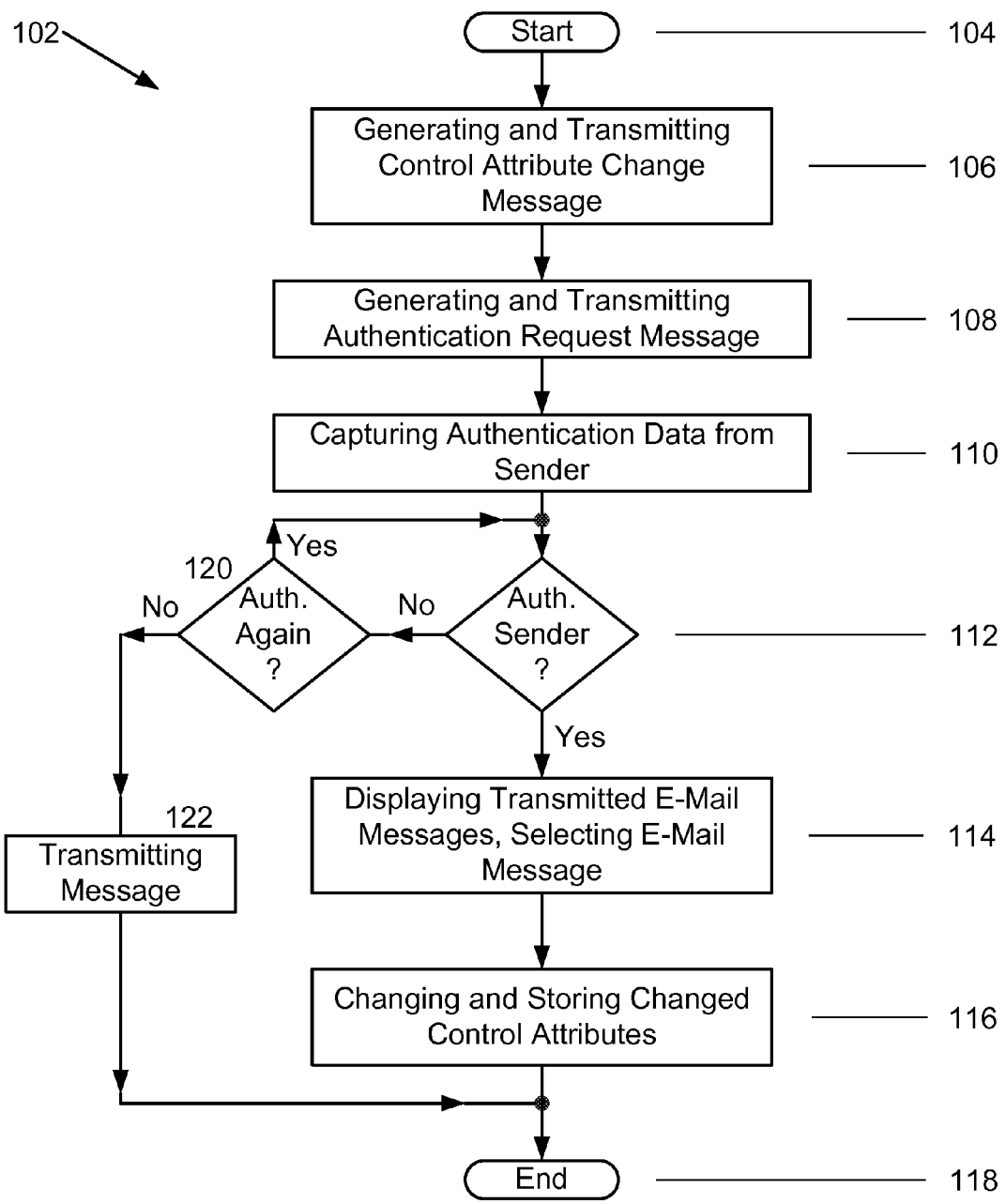
FIG. 13 is a flowchart illustrating an exemplary process for changing control attributes of an e-mail message after transmission.

FIG. 13 is a flowchart 102 illustrating an exemplary process for changing control attributes of an e-mail message after transmission by the sender. The method starts 104 for EMSC system 10 with the sender operating computing device 14-1 deciding that at least one control attribute assigned to a transmitted e-mail message is to be changed. Next, the sender operates the computing device 14-1 to indicate a desire to change the at least one control attribute by generating a control attribute change message 106 and transmitting the control attribute change message 106 to the CC system 18. After receiving the control attribute change message, the CC system 18 continues processing by generating and transmitting an authentication request message 108 to the BAC system 16. The authentication request message includes at least the security level 34 of the e-mail message and a request for the BAC system 16 to authenticate the sender.

After receiving the authentication request message, the BAC system 16 continues processing by extracting the security level 34 from the authentication request message, determining an authentication data requirement corresponding to the extracted security level, generating a data capture request message that includes at least the authentication data requirement, and transmitting the data capture request message to the communications device 12-m associated with the sender. Next, the communications device 12-m continues processing by displaying the authentication data requirement on the screen 24 for the sender to see. After reading the authentication data requirement, the sender continues by capturing authentication data 110 from his self with the communications device 12-m in accordance with the authentication data requirement Next, the communications device 12-m determines whether the captured authentication data is of sufficient quality for conducting an authentication transaction. When the captured data is insufficient, the communications device 12-m displays a message on the screen 24 prompting the sender to again capture authentication data in accordance with the authentication data requirement until sufficient quality authentication data is captured. Otherwise, when the captured authentication data is of sufficient quality, the sender continues by activating a button 22 that causes the communications device 12-m to continue by transmitting the captured authentication data to the BAC system 16.

After receiving the captured authentication data from the communications device 12-m, the BAC system 16 continues by comparing 112 the captured authentication data against authentication data of the sender stored therein and generating a matching score. The matching score is compared against a threshold to determine if the captured authentication data and the stored authentication data match. When the captured authentication data matches the stored authentication data, the identity of the sender is successfully authenticated 112. The BAC system 16 continues by generating and transmitting a successful authentication message to the CC system 18 and the communications device 12-m. Next, the CC system 18 continues by transmitting the successful authentication message to the computing device 14-1.

After receiving the successful authentication message, the computing device 14-1 continues processing by displaying transmitted e-mail messages 114 of the sender for the sender to see. Modified e-mail messages generated from e-mail messages transmitted by the sender and stored in the CC system 18 may also be displayed. Any number of e-mail messages transmitted by the sender may be displayed. The sender continues by selecting the transmitted e-mail message 114 whose control attributes require changing. Next, the computing device 14-1 continues by presenting the display screen 46 for the sender to see. The sender continues by indicating that control attributes of the selected e-mail message are to be changed. In response, the computing device 14-1 continues by presenting the control attribute display screen 48 for the sender to see. Next, the sender continues by changing at least one of the control attributes 116 on the display screen 48. The computing device 14-1 then continues processing by transmitting control attributes, including the changes, to the CC system 18 which continues processing by storing the changed control attributes 116. Next, processing ends 118. By virtue of including the modified e-mail messages in the display for the sender to see, the CC system 18 facilitates enabling the sender to include different control attributes in the modified e-mail message for each specified recipient. Thus, the sender is enabled to control e-mail message security for each specified recipient separately.

However, when the sender is not successfully authenticated 112, processing continues by authenticating the sender again 120 by repeating operation 112. In this alternative exemplary embodiment, the BAC system 16 may again 120 attempt to authenticate the sender by repeating operation 112 three times before determining that the sender cannot be authenticated 120. After determining that the sender cannot be authenticated 120, the BAC system 16 continues processing by transmitting a message 122 notifying the CC system 18 of the unsuccessful authentication, and the CC system 18 continues by transmitting a message 122 to the computing device 14-1 notifying the sender of the unsuccessful authentication. Next, processing ends 118. Alternatively, the BAC system 16 may attempt to authenticate the sender 120 any number of times before determining that the sender cannot be authenticated.

Although the sender changes at least one control attribute in the exemplary control attribute changing process, in alternative processes the sender may change the control attributes by assigning at least one additional different control attribute to the e-mail message or may remove at least one control attribute from the e-mail message. After changing the control attributes of an e-mail message, the e-mail message is displayed in accordance with the changed control attributes.

Although the authentication data is captured with the communications device in the exemplary processes described herein, in alternative processes the authentication data may automatically be captured by the computing device. Additionally, although the communications device determines the quality of captured authentication data in the exemplary processes described herein, in alternative processes the BAC system 16 may determine the quality of captured authentication data. In such alternative processes, the communications device transmits captured authentication data to the BAC system 16 without determining the quality. After receiving the captured authentication data, the BAC system 16 determines whether the captured authentication data is of sufficient quality. If the captured authentication data is not of sufficient quality, the BAC system 16 and the communications device communicate such that authentication data of sufficient quality is captured.

Although the security level 34 is included in the authentication request message and is used to determine the authentication data requirement in the exemplary processes described herein, in alternative processes instead of including the security level 34 in the authentication request message any information that may be used to determine the authentication data requirement may be included in the authentication request message.

The exemplary processes described herein include operations performed by, and communications sent between, components of the ESMC system 10 that facilitate enabling increased sender control over e-mail messages after transmission and facilitate increasing the security of e-mail messages against imposter access. Because communications of the computing devices 14-n occur over the first communications channel and communications of the communications devices 12-m occur over the second communications channel, communications of the computing devices 14-n are out-of-band with communications of the communications devices 12-m in the exemplary processes described herein. However, a user may not have access to both his communications device 12-m and a computing device 14-n when desiring to conduct any of the processes described herein. Consequently, in alternative exemplary embodiments, the processes described herein may be conducted with either the communications device 12-m of a user or a computing device 14-n operated by the user. Because either a communications device 12-m or a computing device 14-n is used in such alternative embodiments, one device is used. As a result, it should be understood that communications of such alternative embodiments are not conducted out-of-band. Instead, communications of such alternative embodiments are conducted in-band over the communications channel of the one device.

Figure 14:
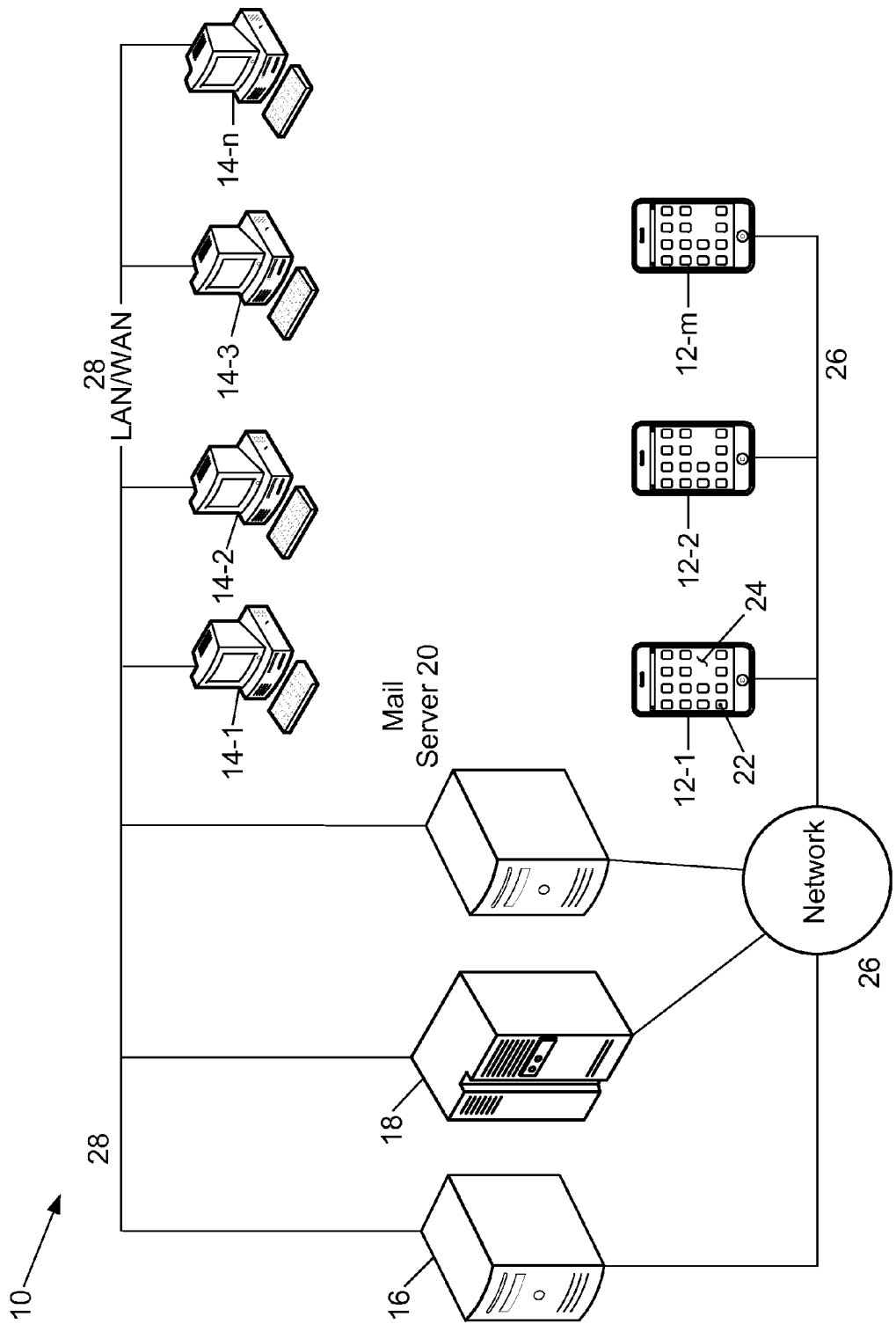
FIG. 14 is a diagram of an alternative exemplary embodiment of the e-mail security computer system for increasing the security of electronic messages against access by imposters.

The information shown in FIG. 14 is the same information shown in FIG. 1 as described in more detail below. As such, components illustrated in FIG. 14 that are identical to components illustrated in FIG. 1, are identified using the same reference numerals used in FIG. 1.

FIG. 14 is a diagram of an alternative exemplary embodiment of the EMSC system 10 for increasing the security of electronic messages against access by imposters. This alternative embodiment is similar to that shown in FIG. 1. However, each of the communications devices 12-m is also configured to communicate with the CC system 18 and the e-mail server 20 over the network 26. Moreover, the computing devices 14-n are also configured to communicate with the BAC system 16 over the network 28.

This alternative EMSC system 10 facilitates using either the communications device 12-m of a user or a computing device 14-n operated by the user to conduct the e-mail message generation process, the content accessing process, and the control attribute changing process as described herein. In this alternative embodiment, the communications device 12-m of a user may perform all operations described herein with regard to a computing device 14-n operated by the user when a computing device 14-n is unavailable. Likewise, a computing device 14-n operated by the user may perform all operations described herein with regard to the communications device 12-m of the user when the communications device 12-m of the user is unavailable. As a result, this alternative exemplary embodiment enables conducting any of the exemplary processes described herein, as an in-band process, with either the communications device 12-m of a user or a computing device 14-n operated by a user.

The above-described methods for generating e-mail messages, accessing contents of e-mail messages, and controlling attributes of e-mail messages facilitate increasing the security of e-mail messages against fraudulent access by imposters and facilitate reducing inadvertent distribution of e-mail message information by recipients. More specifically, after receiving an e-mail message at a control system and verifying the specified recipients of the e-mail message, the control system stores information regarding the e-mail message, generates modified e-mail messages, and transmits a different one of the modified e-mail messages to each specified recipient. After successfully authenticating a specified recipient, the specified recipient is permitted to access and view the e-mail message contents in accordance with control attributes assigned to the received modified e-mail message. Each of the control attributes of an e-mail message stored in the control system may be changed after the e-mail is transmitted by the sender. More specifically, after successfully authenticating the sender, the sender may access and change the control attributes of a previously transmitted e-mail message. As a result, the security of e-mail messages is facilitated to be increased against fraudulent access by imposters, inadvertent distribution of e-mail message information is facilitated to be reduced, and electronic mail security system performance is facilitated to be enhanced in a cost effective and reliable manner.

Exemplary embodiments of systems and processes for increasing the security of e-mail messages against fraudulent access by imposters are described above in detail. The processes are not limited to use with the specific computer system embodiments described herein, but rather, the processes can be utilized independently and separately from other processes described herein. Moreover, the invention is not limited to the embodiments of the systems and processes described above in detail. Rather, other variations of the processes may be utilized within the spirit and scope of the claims.

While the invention has been described in terms of various specific embodiments, those skilled in the art will recognize that the invention can be practiced with modification within the spirit and scope of the claims.

What is claimed is:

1. A method for generating e-mail messages with increased security comprising:
   receiving an e-mail message at a control system, the e-mail message having recipients, a security level, control attributes, and e-mail message contents;
   verifying the recipients using the control system;
   storing the recipients, security level, control attributes, and e-mail message contents in the control system when each recipient is verified;
   generating modified e-mail messages from the e-mail message and transmitting a different one of the modified e-mail messages to each recipient;
   receiving a transmitted modified e-mail message at a computing device operated by one of the recipients;
   clicking on a function included in the received modified e-mail message to cause the recipient computing device to communicate with the control system;
   extracting a transaction identifier from the function and obtaining a recipient identifier from the received modified e-mail message;
   comparing the extracted transaction identifier against transaction identifiers included in a transaction registry;
   mapping the extracted transaction identifier to an e-mail identifier and a recipient identifier included in the transaction registry;
   determining that the e-mail message contents are stored in the control system and can be transmitted to the recipient computing device, when the extracted transaction identifier matches a transaction identifier in the transaction registry;
   capturing authentication data from the one recipient and authenticating the one recipient using an authentication system; and
   permitting the one recipient to view the e-mail message contents in accordance with the control attributes when the one recipient is successfully authenticated.

2. A method for generating e-mail messages in accordance with claim 1, further comprising:
   indicating a desire to change the control attributes after transmitting the e-mail message;
   capturing authentication data, from e-mail message sender, corresponding to a highest security level with a device associated with the sender and authenticating the sender using the authentication system; and
   changing the control attributes and storing the changed attributes in the control system when the sender is successfully authenticated.

3. A method for generating e-mail messages in accordance with claim 1, said verifying the recipients using the control system comprising:
   comparing each recipient against enrollment data records stored in the authentication system; and
   determining that a recipient is enrolled in the authentication system when the recipient matches an enrollment data record.

4. A method for generating e-mail messages in accordance with claim 3, further comprising:
   generating an e-mail message identifier and a transaction identifier for the e-mail message when each recipient is enrolled in the authentication system; and
   storing the e-mail message identifier, transaction identifier, and e-mail message contents in the control system.

5. A method for generating e-mail messages in accordance with claim 1, further comprising:
   generating a control attribute change message using a computing device operated by the sender and transmitting the control attribute change message to the control system;
   capturing authentication data from the sender and authenticating the sender using the authentication system;
   displaying transmitted e-mail messages of the sender for the sender to see when the sender is successfully authenticated;
   selecting a displayed e-mail message; and
   changing at least one of the control attributes of the selected e-mail message.

6. A method for generating e-mail messages in accordance with claim 1, said generating modified e-mail messages comprising:
   generating a different function for each recipient;
   removing the e-mail message contents from the e-mail message;
   generating a copy of the e-mail message for each specified recipient; and
   inserting each function in a respective one of the e-mail message copies.

7. A method for generating e-mail messages in accordance with claim 1, further comprising capturing authentication data from an e-mail message sender using a communications device of the sender after transmitting the e-mail message to the control system.

8. A computer system for increasing the security of e-mail messages comprising:
   at least one computing device configured to create and transmit e-mail messages;
   at least one communications device configured to capture authentication data and communicate with other devices;
   an authentication system comprising an authentication database and being configured to communicate with said at least one communications device, to authenticate users sending and receiving e-mail messages, and to store enrollment data records of a plurality of users;
   a control system configured to generate and store identifiers, store and change control attributes of e-mail messages, store e-mail contents, check validity of e-mail message contents, and communicate with said authentication system and said at least one computing device; and
   an e-mail server configured to communicate with said at least one computing device and said control system,
   said control system being further configured to
      generate modified e-mail messages from e-mail messages,
      transmit a different modified e-mail message to each recipient,
      extract a transaction identifier from a function included in one of the transmitted modified e-mail messages and obtain a recipient identifier from the one transmitted modified e-mail message, after one of the recipients clicked on the function,
      compare the extracted transaction identifier against transaction identifiers included in a transaction registry, and map the extracted transaction identifier to an e-mail identifier and recipient identifiers included in the registry, and
      transmit e-mail message contents to the one recipient after the one recipient is successfully authenticated by said authentication system,
   said at least one computing device being further configured to display the e-mail message contents in accordance with control attributes assigned to the e-mail message after the one recipient is successfully authenticated.

9. A computer system for increasing the security of e-mail messages in accordance with claim 8, said at least one computing device being further configured to:
generate a control attribute change message when the user operating said at least one computing device indicates a desire to change the control attributes of an e-mail message after transmission;
display e-mail messages transmitted by the user for the user to see after the user is successfully authenticated by said authentication system; and
change at least one of the control attributes of the e-mail message on a display screen included in said at least one computing device.

10. A computer system for increasing the security of e-mail messages in accordance with claim 8, said authentication system being configured to authenticate users based on biometric authentication data comprising voice, finger, face, iris, or electrocardiogram biometric data.

11. A computer system for increasing the security of e-mail messages in accordance with claim 8, said control system being further configured to:
change the control attributes of an e-mail message; and
store the changed control attributes after a sender transmits the e-mail message and after the sender is successfully authenticated by said authentication system.

12. A computer system for increasing the security of e-mail messages in accordance with claim 8, said control system being further configured to:
generate a different function for each recipient;
remove the e-mail message contents from an e-mail message transmitted from said at least one computing device operated by a sender of the e-mail message;
generate a copy of the e-mail message for each recipient; and
insert each function in a respective one of the e-mail message copies.

13. A computer system for increasing the security of e-mail messages in accordance with claim 8, said authentication system being further configured to:
extract a security level from an authentication request message transmitted from said control system;
determine an authentication data requirement corresponding to the extracted security level; and
authenticate an e-mail message sender using biometric data captured in accordance with the authentication data requirement to confirm that the sender is authorized to send e-mail messages to the recipients.

14. A computer system for increasing the security of e-mail messages in accordance with claim 8, said authentication system being further configured to verify each recipient of an e-mail message while a sender drafts the e-mail message.

15. A computer program recorded on a non-transitory computer-readable recording medium included in an electronic mail security computer system for enabling increased security of e-mail messages, the computer program being comprised of instructions, which when read and executed by the electronic mail security computer system, cause the electronic mail security computer system to perform at least the following operations:
verify that each recipient of an e-mail message can be authenticated, the e-mail message having control attributes and e-mail message content;
store the recipients, control attributes and e-mail message content;
generate modified e-mail messages from the e-mail message, transmit a different one of the modified e-mail messages to each recipient, and notify each recipient regarding receipt of the modified e-mail message;
extract a transaction identifier from a function included in one of the transmitted modified e-mail messages and obtain a recipient identifier from the one transmitted modified e-mail message, after one of the recipients clicked on the function;
compare the extracted transaction identifier against transaction identifiers included in a transaction registry, and map the extracted transaction identifier to an e-mail identifier and recipient identifiers included in the transaction registry
authenticate the one recipient; and
display the e-mail message contents in accordance with the control attributes for the one recipient to see when the one recipient is successfully authenticated.

16. A computer program in accordance with claim 15 further comprising instructions, which read and executed by the electronic mail security computer system, cause the electronic mail security computer system to authenticate an e-mail message sender using authentication data captured from the sender, before each recipient of the e-mail message is verified.

17. A computer program in accordance with claim 15 further comprising instructions, which read and executed by the electronic mail security computer system, cause the electronic mail security computer system to:
change the control attributes when an e-mail message sender desires to change the control attributes after transmitting the e-mail message;
authenticate the sender with authentication data captured from the sender; and
display the control attributes for the sender to see when the sender is successfully authenticated.

* * * * *